United States Patent
Dou et al.

(10) Patent No.: US 11,526,370 B2
(45) Date of Patent: Dec. 13, 2022

(54) CLOUD RESOURCE MANAGEMENT USING MACHINE LEARNING

(71) Applicant: MICROSOFT TECHNOLOGY LICENSING, LLC., Redmond, WA (US)

(72) Inventors: Yiping Dou, Bellevue, WA (US); Tanmayee Prakash Kamath, Seattle, WA (US); Arun Ramanathan Chandrasekhar, Redmond, WA (US); Claude Remillard, Redmond, WA (US); Mark Steven Schnitzer, Kirkland, WA (US); Balan Subramanian, Kirkland, WA (US); Neelakantan Sundaresan, Bellevue, WA (US); Yijin Wei, Bellevue, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 201 days.

(21) Appl. No.: 16/297,694

(22) Filed: Mar. 10, 2019

(65) Prior Publication Data
US 2020/0285503 A1 Sep. 10, 2020

(51) Int. Cl.
*G06F 9/455* (2018.01)
*G06N 20/20* (2019.01)
*G06F 17/18* (2006.01)

(52) U.S. Cl.
CPC .......... *G06F 9/45558* (2013.01); *G06F 17/18* (2013.01); *G06N 20/20* (2019.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 2018/0349168 A1* | 12/2018 | Ahmed | G06F 11/3452 |
| 2020/0104189 A1* | 4/2020 | Gopalan | G06F 9/5088 |
| 2020/0125419 A1* | 4/2020 | Zhang | G06F 9/45533 |
| 2020/0209946 A1* | 7/2020 | Visconti | G06F 1/28 |

(Continued)

OTHER PUBLICATIONS

Renyu Yang, "Intelligent Resource Scheduling at Scale: a Machine Learning Perspective", IEEE https://doi.org/10.1109/SOSE.2018.00025 (Year: 2018).*

(Continued)

*Primary Examiner* — Wynuel S Aquino (57) ABSTRACT

A cloud resource management system trains, through ensemble learning, multiple time series forecasting models to forecast a future idle time of a virtual machine operating on a cloud computing service. The models are trained on historical usage and metric data of the virtual machine. The metric data includes CPU usage, disk usage and network usage. A select one of the models having the best accuracy for a target virtual machine is used in a production run to predict when the virtual machine will be idle. At this time, the virtual machine may be automatically shutdown in order to reduce the expense associated with the continued operation of the virtual machine.

19 Claims, 4 Drawing Sheets

(56) References Cited

U.S. PATENT DOCUMENTS

2020/0311617 A1* 10/2020 Swan ................. G06N 20/00

OTHER PUBLICATIONS

Sharkh, "An evergreen cloud: Optimizing energy efficiency in heterogeneous cloud computing architectures", 2017, Elsevier (Year: 2017).*

Paulraj, "A combined forecast-based virtual machine migration in cloud data centers", Elsevier Ltd (Year: 2018).*

Damra, Bassel, "Auto-stop your VM based on CPU utilization (Azure Automation)", Retrieved From: https://www.linkedin.com/pulse/auto-stop-your-vm-based-cpu-utilization-azure-automation-bassel-damra, Nov. 26, 2018, 8 Pages.

"International Search Report and Written Opinion issued in PCT Application No. PCT/US20/016681", dated Apr. 29, 2020, 13 Pages.

Sharma, Girish, "Azure Alerts—How to create alert rules in Azure monitoring", Retrieved From: https://www.youtube.com/watch?v=2NMj9EIR?los, Sep. 3, 2018, 7 Pages.

Livera, et al., "Forecasting Time Series With Complex Seasonal Patterns Using Exponential Smoothing", In Working Paper 15/09, Department of Econometrics and Business Statistics, Monash University, Oct. 28, 2010, 40 Pages.

Ngo, et al., "The Box-Jenkins Methodology for Time Series Models", In Proceedings of the SAS Global Forum Conference, vol. 6, Paper 454-2013, Apr. 28, 2013, pp. 1-11.

Nikos, "Improving your Forecasts using Multiple Temporal Aggregation", Retrieved From: https://web.archive.org/web/20190208114549/https://kourentzes.com/forecasting/2014/05/26/improving-forecasting-via-multiple-temporal-aggregation/, May 26, 2014, 11 Pages.

Taylor, et al., "Forecasting at Scale", Published by PeerJ Preprints, Sep. 27, 2017, pp. 1-25.

Wei, et al., "Some Consequences of Temporal Aggregation in Seasonal Time Series Models", In NBER Book Seasonal Analysis of Economic Time Series, Jan. 1978, pp. 433-448.

* cited by examiner

CLOUD RESOURCE MANAGEMENT USING MACHINE LEARNING

BACKGROUND

A cloud computing service provides shared computing resources to users or customers. The computing resources may include hardware and software resources. The hardware resources may include processor elements (e.g., cores of a central processing unit, graphics processing units), memory, storage, networks, etc. The software resources may include operating systems, database systems, applications, libraries, programs, etc. A cloud computing service may include multiple data centers located in various geographical locations with each data center having multiple servers.

The cloud computing service may offer different types of service plans or subscriptions for the computing resources. For example, the cloud computing service may provide a service plan that offers software as a service (SasS), platform as a service (PaaS), infrastructure as a service (IaaS) as well as provide resources to support application development. With SaaS, software may be licensed on a subscription plan. A PaaS subscription plan may offer access to computing resources as a platform that enables customers to develop, execute, and manage applications. An IaaS subscription plan offers resources that enable a customer to create and deploy virtual machines.

The subscriptions may have different payment options that are billed based on the type of computing resources needed and/or on the usage of these resources. The customer may be billed for the actual usage or the customer may have a flat rate for the use of its computing resources. Often a user may provision a virtual machine with an intended amount of computing resources. The virtual machine may be operational for a period of time and then kept idle without using any of the resources provisioned to the virtual machine. However, the customer is billed for the idle time of the virtual machine even though the virtual machine is no longer running.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cloud resource management system utilizes a machine learning technique to forecast when a virtual machine hosted by a cloud computing service may become idle at a future time. Several machine learning models are trained on historical metric data of a virtual machine over a continuous time period. The metric data may include CPU usage, disk I/O usage and/or network I/O usage. The models are tested and at least one model is selected for use in a production run. The selected model is then used to forecast a time in an immediately succeeding time period when any one or combination of metrics of the virtual machine falls below an idle threshold.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed utilizes machine learning techniques to forecast when a virtual machine hosted by a cloud computing service may become idle at a future time. Several machine learning models are trained on historical metric data of a virtual machine over a continuous time period. The models are tested and at least one model is selected for use in a production run. The selected model is then used to predict the CPU usage for a succeeding future time period and to automatically turn off the virtual machine when the predicted CPU usage is below an idle threshold.

A virtual machine is a software implementation of a computer that executes programs like a physical machine or computer. A hypervisor or virtual machine monitor provisions or creates the virtual machine and then runs the virtual machine. The hypervisor provides the virtual machine with a guest operating system and manages the execution of the guest operating system. A customer (i.e., user, developer, client) of a cloud computing service may configure the virtual machine to utilize a certain amount and type of computing resources.

Metric data representing the resource consumption of a virtual machine at equally-spaced time intervals is collected over the course of a training period. Usage data representing the type of resources consumed by the virtual machine and other configuration information of the virtual machine is also collected to forecast the savings in shutting down the virtual machine while idle.

The metric data may represent CPU usage, disk I/O usage, and network I/O usage. CPU usage is the CPU time as a percentage of the CPU's capacity. The CPU time is the amount of time that the CPU uses. CPU time differs from elapsed time which includes when the CPU is idle or waiting for the completion of an operation, such as an input/output (I/O) operation. The disk I/O usage is a measurement of the active disk I/O time. The active disk I/O time is the amount of time that read and write I/O operations are performed to a logical disk. The network I/O usage is the amount of time taken to complete network I/O operations.

The metric data is used in an ensemble learning methodology to train multiple time series forecasting models to predict when the CPU usage of the virtual machine may fall below an idle threshold. Multiple time series forecasting models are trained since the behavior of a time series of a virtual machine is unknown.

In one aspect, the models are trained using different machine learning techniques such as: autoregressive integrated moving average (AMNIA); error, trend, seasonality (ETS); Trigonometric Box-Cox transformation, ARMA errors, Trend and Seasonal components (TBATS); and a decomposable time series technique, such as Prophet. These models are trained and tested offline with the metric data collected at predetermined time intervals during a training period. The models are tested in order to determine which one of the models performs best for a target virtual machine.

The model selected for a target virtual machine is then used in a subsequent production run to forecast when the target virtual machine will be idle. The virtual machine may be shut down temporarily at the forecasted idle time and restarted thereafter. In one aspect, the model predicts when the virtual machine will be idle in an upcoming time period based on a predicted time when the CPU usage of the virtual machine will fall below an idle threshold. In this manner, the customer of the cloud computing system saves on the cost of operating the virtual machine during the idle time.

Attention now turns to a further discussion of the system, devices, components, and methods for cloud resource management.

System

Figure 1:
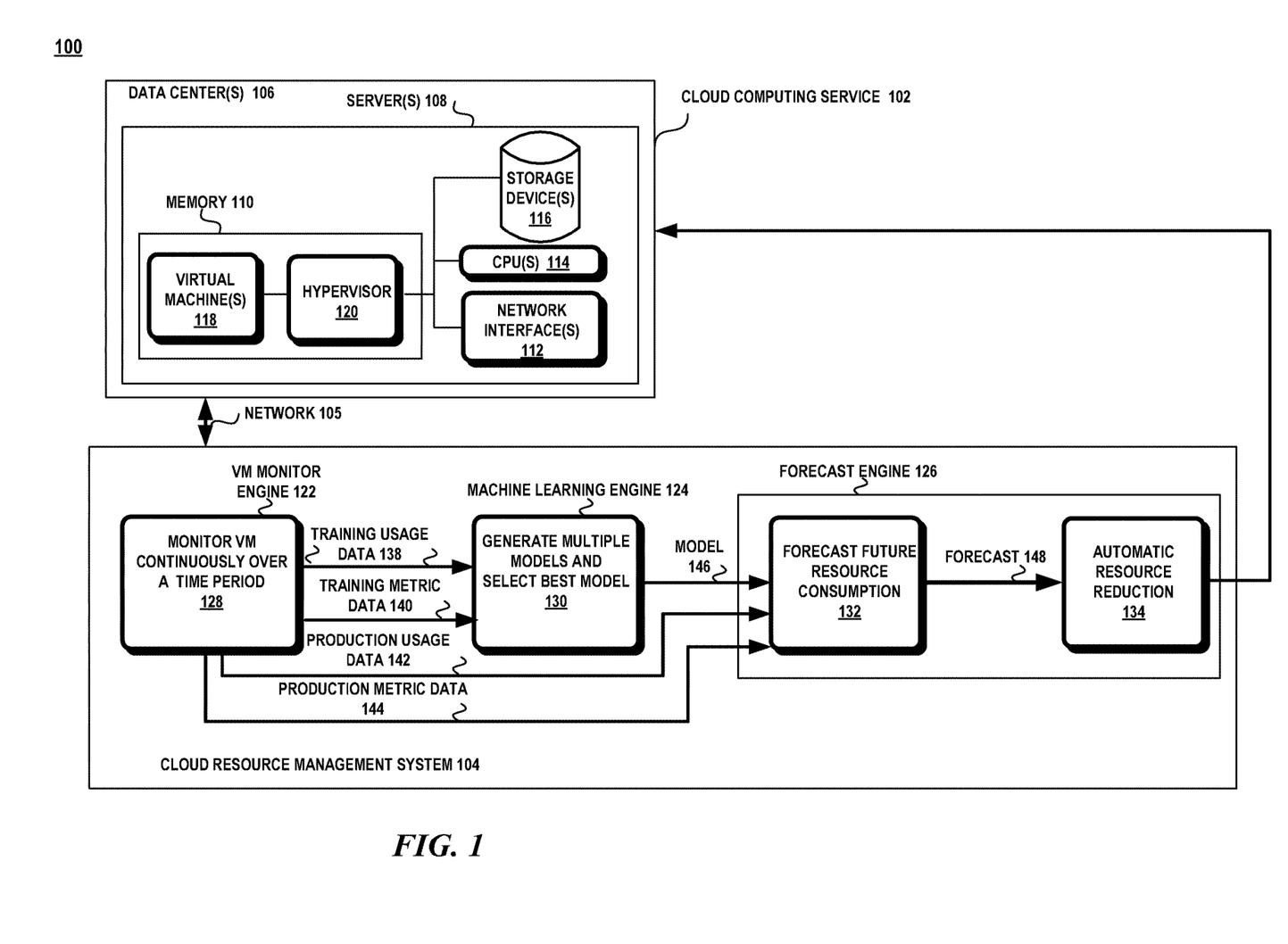
FIG. 1 illustrates an exemplary cloud resource management system and an exemplary cloud computing service.

FIG. 1 illustrates a block diagram of an exemplary system 100 in which various aspects of the invention may be practiced. As shown in FIG. 1, system 100 includes a cloud computing service 102 communicatively coupled to a cloud resource management system 104. The cloud computing service 102 includes a number of computing resources that are made available to one or more customers through a network 105. Examples of a cloud computing service include, without limitation, MICROSOFT AZURE® and GOOGLE CLOUD®.

The cloud computing service 102 is composed of one or more data centers 106. A data center 106 may be located in a particular geographic location. A data center 106 has one or more servers 108. A server 108 includes a memory 110, one or more network interfaces 112, one or more CPUs 114, and multiple storage devices 116. The memory 110 may include one or more virtual machines 118 coupled to at least one hypervisor 120.

The cloud resource management system 104 is communicatively coupled to the cloud computing service 102. The cloud resource management system 104 includes a VM monitor engine 122, a machine learning engine 124, and a forecast engine 126. The VM monitor engine 122 monitors the virtual machines 118 operating on the cloud computing service 102 continuously over a time period.

During a training period, training usage data 138 and training metric data 140 are generated from the operation of a virtual machine 118 and sent to the VM monitor engine 122 (block 128). In one aspect, the training usage data 138 includes the type of operating system used by the virtual machine (e.g., Linux, Windows, Paas), the size of the virtual machine, the location of the data center in which the virtual machine resides, the type of virtual machine, and the type of cloud computing service.

A cloud computing service 102 may provision a platform service with different sizes that are based on the resources needed to provision a virtual machine. For example, in the MICROSOFT AZURE® cloud computing service, there are several sizes offered to provision a virtual machine based on the number of CPU cores, the size of the memory, the amount of temporary storage, the maximum number of network interface cards (NIC) and network bandwidth. An extra-small size of a virtual machine consists of a single CPU core, 0.768 gigabytes of memory, 20 gigabytes of temporary storage (e.g., disk storage), and a single NIC with low network bandwidth. A small size may include a single CPU core, 1.75 gigabytes of memory, 225 gigabytes of temporary storage, and a single NIC with moderate network bandwidth. A medium size may include two CPU cores, 3.5 gigabytes of memory, 490 gigabytes of temporary storage, and a single NIC with moderate network bandwidth. A large size may include four CPU cores, 7 gigabytes of memory, 1000 gigabytes of temporary storage, and two NIC with high network bandwidth. An extra-large size may include eight CPU cores, 14 gigabytes of memory, 2040 gigabytes of temporary storage, and four NIC with high network bandwidth. Other sizes are available having a predefined amount of CPU cores, memory, temporary storage, NICs, and network bandwidth.

The training metric data 140 is generated for each equally-spaced time interval (e.g., five-minute interval) during a training period (e.g., twenty consecutive days). The training metric data 140 may include for each time interval, the CPU usage during each time interval, the amount of disk usage used during each time interval, and the amount of network usage during each time interval. Multiple metrics are used to train the ensemble of models since a single metric may not accurately capture the behavior of the virtual machine. For instance, a user might be in browser mode while the virtual machine is executing read/write operations to disk storage. In this situation, the CPU usage is low and the disk I/O usage is high. By relying solely on the CPU usage as the only metric would erroneously represent the resource usage of the virtual machine.

The machine learning engine 124 uses ensemble learning to train multiple models on the training usage and metric data of a virtual machine during a training period (block 130). In one aspect, parallel ensemble learning is used where different models are trained in parallel in order to exploit independence between the models. Various models are also trained since the behavior of the time series representing a virtual machine is not known before the virtual machine is monitored. The best model to represent the time series of a virtual machine will be selected based on training performance metrics for further prediction.

The models are trained on time series forecasting techniques. In particular, the machine learning engine may perform ensemble learning using the following time series forecasting techniques: an autoregressive integrated moving average (AMNIA); error, trend, seasonality (ETS); Trigonometric Box-Cox transformation, ARMA errors, Trend and Seasonal components (TBATS); and Prophet. However, it should be noted that the disclosure is not limited to these time series forecasting techniques and that other such techniques may be employed as well.

Forecasting is about predicting the future as accurately as possible using historical data and knowledge of future events. Forecasting situations differ immensely in the types of data patterns that occur over time, the time horizon, and in the factors that affect future events. Time series forecasting is a technique that predicts a sequence of events from a time series. A time series is an ordered sequence of data points occurring at successive equally-spaced points in time. The time series is analyzed to identify patterns with the assumption that these patterns will exist in the future.

A time series is defined by the following factors: level; trend; seasonality; and noise. The level is the baseline or average value in the time series. A trend exists when there is an increase or decrease in the data. A seasonal pattern or seasonality occurs when a time series is affected by seasonal factors such as the time of the day, the day of the week, the hour of the day, etc. Noise exists when there is variability in the data that cannot be explained by the model.

An ARIMA model uses a weighted sum of recent past observations where an exponentially decreasing weight is used for the past observations. In this manner, ARIMA accounts for the growth or decline in the time series data, the rate of change of the growth/decline in the time series data and the noise between consecutive time points. ARIMA is typically used for non-stationary data. A time series is stationary if its statistical properties, such as mean and variance are constant over time. A time series is non-stationary when there is a variable variance and a changing mean. ARIMA uses differencing to transform a non-stationary time series into a stationary time series before identifying the pattern.

ARIMA stands for AutoRegressive Integrated Moving Average and typically represented as ARIMA(p, d, q). An autoregressive model uses the dependent relationship between an observation and p lagged observations (i.e., previous values). An integrated model uses the differencing technique to make the time series stationary by subtracting an observation from the previous time step and d is the number of times raw observations are differences. The moving average model specifies that an observation depends linearly on current or past residual errors and q is the order of the moving average model.

In one aspect, the techniques used to generate an ARIMA model are described in Wei, W. W. S. (1979), "Some consequences of temporal aggregation in seasonal time series models", https://www.census.gov/ts/papers/Conference1978/Wei1978.pdf, which is hereby incorporated by reference. The Akaike Information Criteria is used to fit the training data to obtain the estimated parameters p, d, and q for the ARIMA model.

ETS is an acronym for Error, Trend and Seasonality. ETS is an exponential smoothing method to explicitly model error, trend and seasonality in a time series. Exponential smoothing uses an exponential window function to smooth a time series. This method computes a weighted average on past observations with the weights decaying exponentially as the observations get older. ETS is preferable for virtual machines that have strong seasonal patterns and is used to quickly capture the day of the week and hour of the day seasonal effects. ETS is described more fully in Hyndman, R. J., Koehler, A. B., Snyder, R. D., Grose, S., "A state space framework for automatic forecasting using exponential smoothing methods", International Journal of Forecasting, 18, 439-454 (2002), which is hereby incorporated by reference.

TBATS is an acronym for Trigonometric Seasonal, Box-Cox Transformation, ARIMA residuals, Trend and Seasonality. TBATS can model multiple seasonal effects, high-frequency seasonality and non-integer seasonality. A virtual machine may have multiple seasonal patterns, such as different monthly, weekly and daily seasonality, which would be more readily captured by TBATS. TBATS is further described in DeLivera, et al., "Forecasting time series with complex seasonal patterns using exponential smoothing", Journal of the American Statistical Association, 106(496), 1513-1527, which is hereby incorporated by reference.

Prophet is a time series decomposition technique that models a time series as a combination of trend, seasonality, and noise components. Prophet is fully automatic and has many advantages. The technique does not require much prior knowledge and can automatically discover seasonal trends and other periodic usage patterns. This model is more interpretable and can better capture the predicted trends of various scales of the time series data. Prophet uses a Bayesian-based curve fitting method to predict time series data. A Fourier series is used to represent multi-period seasonality and Stan's Maximum A Posterior (MAP) is used to obtain the posterior distribution for the model parameters. Prophet is further described in Taylor S. J. and Benjamin L., "Forecasting at scale", The American Statistician, 72(1): 37-45, (2018), https://doi.org/10.7287/peerj.preprints.3190v2, which is hereby incorporated by reference.

A portion of the training data is reserved to test each of the trained models (block 130). At least one of the models is selected for use in a production run for a target virtual machine (block 130). The model having the closest forecasted results to the actual results is selected for the production run (block 130).

The selected model is used by the forecast engine 126 with production usage data 142 and production metric data 144 to forecast the time when the CPU usage will be below the idle threshold (block 132). The forecast engine 126 may utilize the usage data to produce cost estimates of the savings in shutting down a virtual machine during a forecasted idle time (block 132).

This forecast may be used to automatically shutdown the virtual machine at the forecasted time and to turn on the virtual machine thereafter (block 134). Alternatively, the forecast may be provided to the user of the virtual machine along with the estimated savings in order for the user to decide whether or not to shutdown the virtual machine (block 134). The user may direct the cloud resource management system 104 to take an appropriate action, such as, shutdown the virtual machine for a limited time span, increase usage of the virtual machine, ignore the forecast, and/or reduce the amount of resources consumed by the virtual machine (block 134).

Although the system 100 as shown in FIG. 1 has a limited number of elements in a certain topology, it may be appreciated that the system 100 may include more or less elements in alternate topologies as desired for a given implementation. For example, the cloud resource management system 104 may be incorporated into a data center 106 or part of the cloud computing service 102. The machine learning engine 124 and the model 146 may be incorporated into the forecast engine 126.

It should be noted that although the description provided herein is described with respect to the Microsoft Azure cloud computing platform and services, the subject matter disclosed is not limited to this particular cloud computing service and is easily adaptable to other cloud computing systems.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
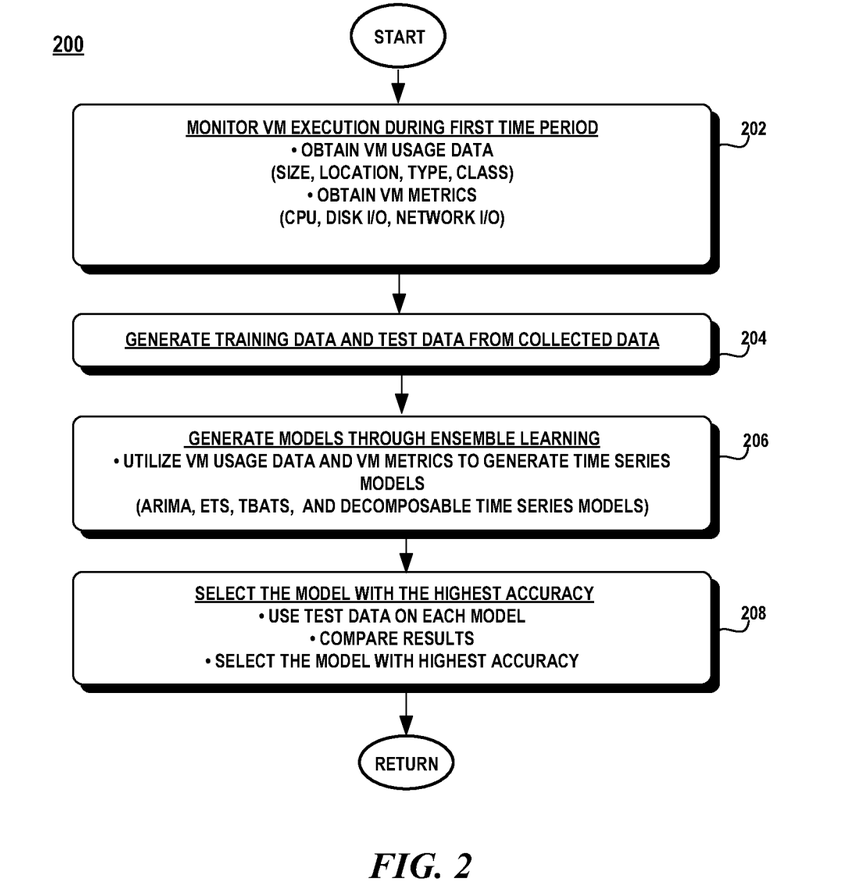
FIG. 2 is a flow diagram illustrating an exemplary method used to train, through ensemble learning, several different machine learning models and to select at least one model for use in a production run.

Referring to FIG. 2, there is shown an exemplary method 200 for training a time series forecasting model. A virtual machine is monitored during a training period to obtain metric data representing a behavior of the virtual machine (block 202). The training period is a consecutive time period in which the metric data is generated at equally-spaced time intervals. For example, the training period may be twenty-eight consecutive days and the metric data is generated at every five-minute interval during the twenty-eight consecutive days. The metric data may include the CPU usage, disk I/O usage and network I/O usage. The usage data may include the sizes of the resources provisioned to the virtual machine (e.g., memory, CPUs, storage devices, NIC, etc.), the type of virtual machine, the location of the data center hosting the virtual machine and the class of the virtual machine.

The usage and metric data that is collected is then split between training data and testing data (block 204). The split may be 50% training data and 50% testing data. However, it should be noted that the portions of the split may vary to suit an intended purpose.

The training data is used to trained each of the time series forecasting models in parallel (block 206). The testing data is used to test each of the time series forecasting models (block 206). As noted above, the time series forecasting models may include an ARIMA model, a TBATS model, an ETS model, and a decomposable time series model, such as Prophet.

During the testing phase, each of the models is tested with the test data to forecast when the CPU usage will be below an idle threshold (block 208). The forecasts from each of the models is compared with actual CPU usage results and the model having the most accurate result is selected (block 208).

Figure 3:
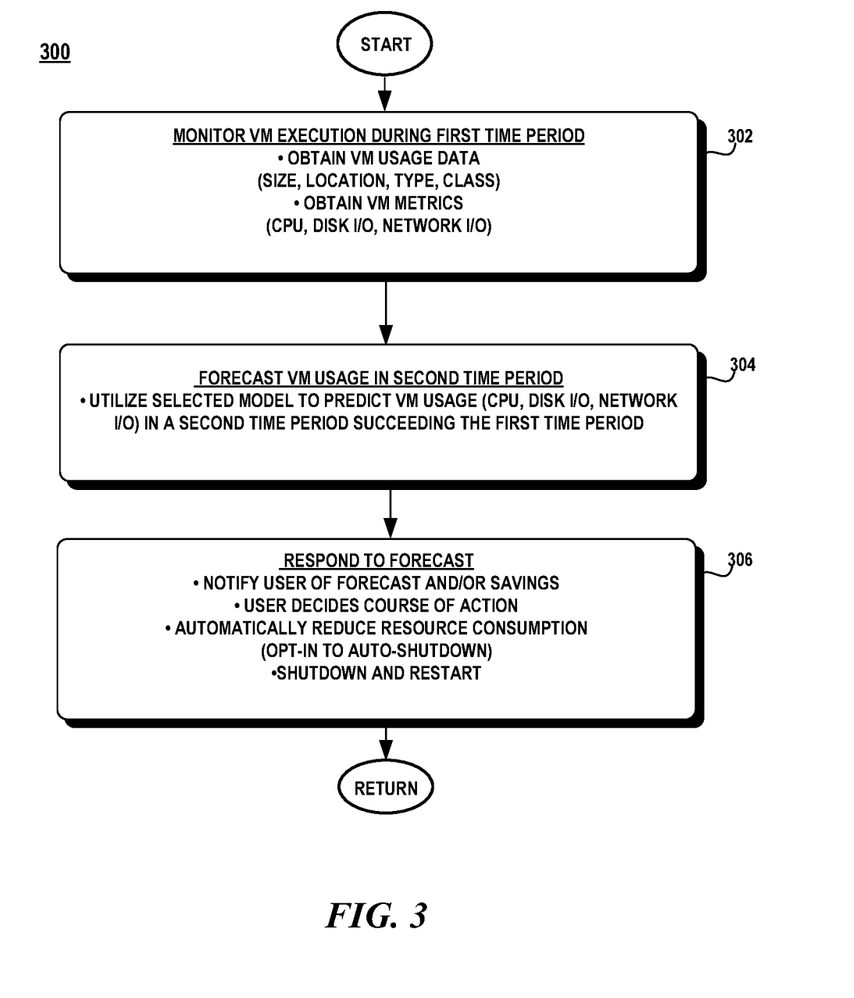
FIG. 3 is a flow diagram illustrating an exemplary method that uses at least one model to forecast when a virtual machine may become idle at a future time.

FIG. 3 illustrates an exemplary method for predicting the idle time of a virtual machine using a time series forecasting model. The cloud resource management system 104 monitors a target virtual machine during a first time period to collect production usage data and production metric data (block 302). The production usage data includes the type of operating system used by the virtual machine (e.g., Linux, Windows, Paas), the size of the virtual machine, the location of the data center in which the virtual machine resides, the type of virtual machine, and the type of cloud computing service. The production metric data includes the CPU usage, disk I/O usage, and network I/O usage and is collected at equally-spaced time intervals (block 304). The production metric data is a time series that is then input to the time series forecasting model to forecast when the CPU usage of the virtual machine will be below an idle threshold, such as below 5% of the CPU usage for a future time period.

When an idle time is forecasted, the cloud resource management system 104 may take one of several actions (block 306). If the user of the virtual machine has configured the virtual machine for an automatic shutdown, the system may initiate actions to automatically shut down the virtual machine for a predetermined length of time. The virtual machine may be restarted after the forecasted idle time. The system may signal the hypervisor to shut down the virtual machine for the intended time period. Alternatively, the user may be informed of the idle time and provided with a cost estimate of the savings in shutting down the virtual machine. The user may initiate actions to shut down the virtual machine, reduce resources provisioned to the virtual machine, ignore the idle time forecast, or take any other action.

In one aspect, a training period is set to a 28-day consecutive time period and the testing period is set to one day immediately following the training period. Metric data from a virtual machine having been operational for at least 21 days during the training period is collected and used to train each of the time series forecasting models. One model is selected and then used to forecast if the virtual machine would be idle during what time of the next day by predicting the CPU usage of the next day. The time when the CPU usage is predicted to be below the idle threshold of the virtual machine, such as below 5% of the virtual machine's CPU usage, is then the forecasted idle time. This forecasted idle time may be used to shutdown the virtual machine for a predetermined length of time, such as 15 minutes.

In another aspect, a time series model may be trained for a virtual machine with training data collected during a training period that may span one day to seven days. In a production run, when the virtual machine is operational by 8 AM on one day and operational during the previous 24 hours, the time series model may be used predict when in the next 24 hours the CPU usage, disk I/O usage, and/or network usage may fall below an idle threshold. This forecasted time may be used to shutdown the virtual machine for the forecasted idle time and restarted thereafter.

Exemplary Operating Environment

Figure 4:
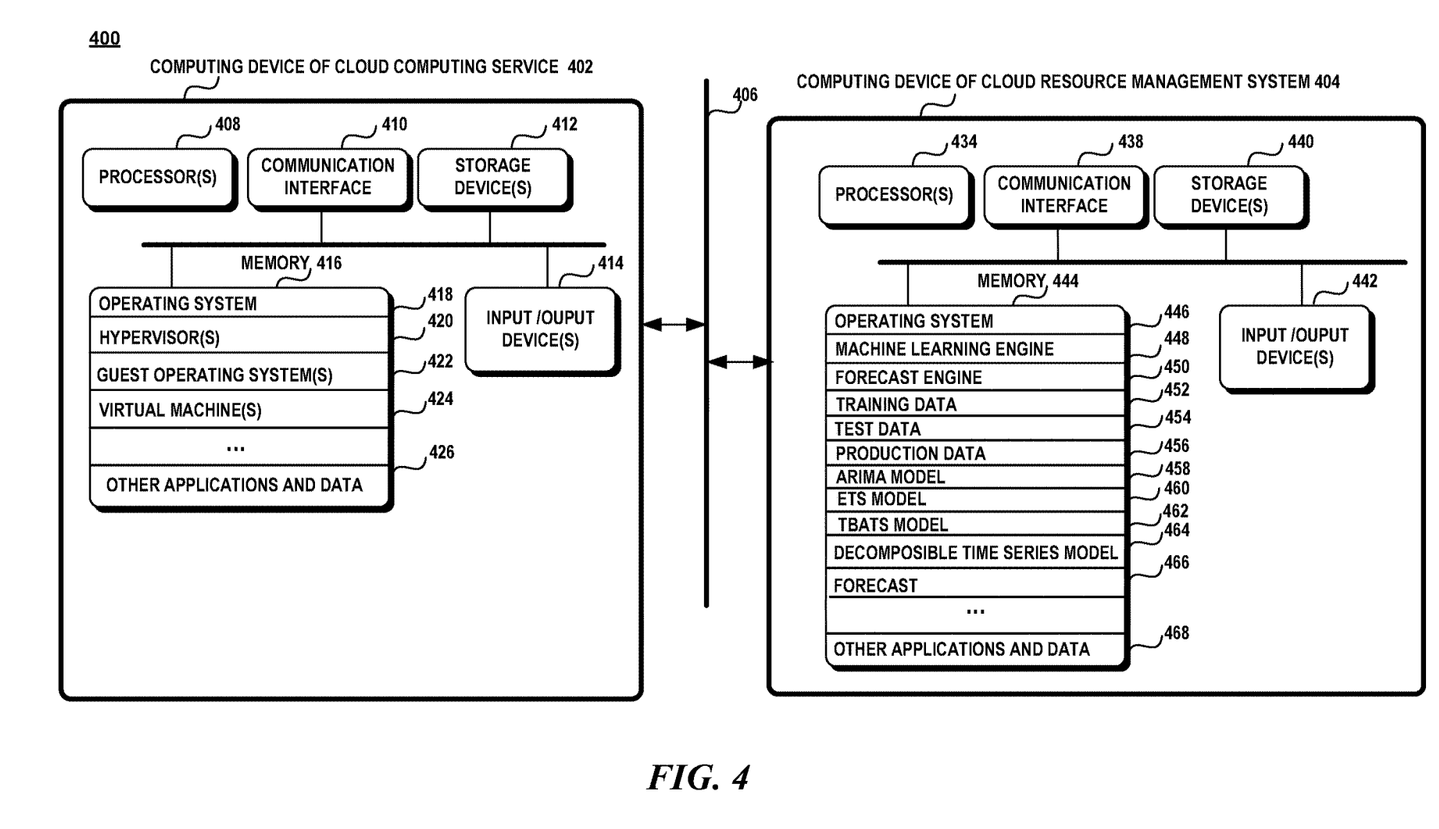
FIG. 4 is a block diagram illustrating an exemplary operating environment.

Attention now turns to a discussion of an exemplary operating embodiment. FIG. 4 illustrates an exemplary operating environment 400 that includes at least one computing device of the cloud computing service 402 and at least one computing device of the cloud resource management system 404 through a network 406. The computing devices 402, 404 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device of the cloud computing service 402 may include one or more processors 408, a communication interface 410, one or more storage devices 412, one or more input and output devices 414, and a memory 416. A processor 408 may be any commercially available or customized processor and may include dual microprocessors and multi-processor architectures. The communication interface 410 facilitates wired or wireless communications between the client machines 402 and other devices. A storage device 412 may be a computer-readable medium that does not contain propagating signals, such as modulated data signals transmitted through a carrier wave. Examples of a storage device 412 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 412 in a client machine 402. The input devices 414 may include a keyboard, mouse, pen, voice input device, touch input device, etc., and any combination thereof. The output devices 414 may include a display, speakers, printers, etc., and any combination thereof.

The memory 416 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 416 may also include one or more external storage devices or remotely located storage devices that do not pertain to propagated signals, such as modulated data signals transmitted through a carrier wave.

The memory 416 may contain instructions, components, and data. A component is a software program that performs a specific function and is otherwise known as a module, program, engine, and/or application. The memory 414 may include an operating system 418, one or more hypervisors 420, one or more guest operating systems 422, one or more virtual machines 424, and other applications and data 426.

A computing device of the cloud resource management system 404 may include one or more processors 434, a communication interface 438, one or more storage devices 440, one or more input and output devices 442, and a memory 444. A processor 434 may be any commercially available or customized processor and may include dual microprocessors and multi-processor architectures. The communication interface 438 facilitates wired or wireless communications between the server machine 404 and other devices. A storage device 440 may be a computer-readable medium that does not contain propagating signals, such as modulated data signals transmitted through a carrier wave. Examples of a storage device 440 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 440 in a server machine 404. The input devices 442 may include a keyboard, mouse, pen, voice input device, touch input device, etc., and any combination thereof. The output devices 442 may include a display, speakers, printers, etc., and any combination thereof.

The memory 444 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 444 may also include one or more external storage devices or remotely located storage devices that do not pertain to propagated signals, such as modulated data signals transmitted through a carrier wave.

The memory 444 may contain instructions, components, and data. A component is a software program that performs a specific function and is otherwise known as a module, program, and/or application. The memory 444 may include an operating system 446, a machine learning engine 448, a forecast engine 450, training data 452, test data 454, production data 456, an ARIMA model 458, an ETS model 460, a TBATS model 462, a prophet model 464, and a forecast 466.

The network 406 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

It should be noted that the subject matter described herein is not limited to the configuration of components shown in FIG. 4. Alternatively, the components of the computing device of the cloud computing service and the cloud resource management system may be incorporated into one computing device or cloud service.

CONCLUSION

A system is disclosed having at least one processor and a memory coupled to the at least one processor. The at least one processor is configured to: receive metric data of a virtual machine, the metric data including CPU usage of the virtual machine at equally-spaced time points over a first time period; train at least one time series forecasting model on the metric data for the first time period; apply the time series forecasting model to determine the CPU usage of the virtual machine at a time interval succeeding the first time period; and when the forecasted CPU usage is below a threshold, initiate actions to reduce resource consumption of the virtual machine.

The metric data includes one or more of disk I/O usage and network I/O usage. The plurality of time series forecasting models includes ARIMA, ETS, TBATS, and Prophet. The reduction of the resource consumption of the virtual machine comprises shutting down the virtual machine.

The at least one processor is further configured to: apply ensemble learning to train a plurality of time series forecasting models on the metric data; select one of the plurality of time series forecasting models to forecast an idle time of the virtual machine based on the CPU usage of the virtual machine; and/or train the at least one time series forecasting model with usage data of the virtual machine, the usage data including sizes of resources used to provision the virtual machine.

A method is disclosed that comprises: obtaining a time series forecasting model trained to predict a future idle time of a virtual machine; receiving metric data during a production run of the virtual machine during a first time period; applying the time series forecasting model to determine the future idle time of the virtual machine; and initiating measures to shut down the virtual machine during the idle time. The method further comprises: determining the future idle time of the virtual machine based on monitoring CPU usage of the virtual machine at a time period immediately preceding the idle time. The future idle time of the virtual machine is based on monitoring disk I/O usage and network I/O usage. The initiation of the measures to shutdown the virtual machine includes requesting permission from a user of the virtual machine to shutdown the virtual machine.

The time series forecasting model is at least one of ARMIA, TBATS, ETS, or a decomposable time series model. The future idle time is based on CPU usage forecasted to be below a threshold. The method further comprises: monitoring the virtual machine over a time period to obtain usage data and metric data; and training the time series forecasting model with the usage data and the metric data. The usage data includes sizes of resources used to provision the virtual machine. The metric data includes CPU usage, network I/O usage, and disk I/O usage obtained at equally-spaced time intervals. Wherein prior to initiating measures to shut down the virtual machine during the idle time, informing a user of the virtual machine of the forecasted idle time.

A device is disclosed having at least one processor and a memory coupled to the at least one processor. The memory includes instructions that when executed on the at least one processor performs actions that: forecast a future idle time of a virtual machine executing on a computing device, the forecast achieved through use of a time series forecasting model trained on historical metric data and usage data of the virtual machine, the historical metric data including a time series of equally-spaced data points representing a CPU usage of the virtual machine, the historical usage data including physical dimensions of resources consumed by the virtual machine, the forecast being below an idle threshold for the virtual machine; and automatically shuts down the virtual machine at the future idle time.

The memory includes further instructions that when executed on the at least one processor performs additional actions that: applies ensemble learning to train a plurality of time series forecasting models to predict when the CPU usage of the virtual machine will be below the idle threshold. The plurality of time series forecasting models includes a decomposable time series model, ARIMA, TBATS, and ETS. The historical metric data further includes disk I/O usage and network I/O usage. Automatically shutting down the virtual machine is performed upon concurrence of a user of the virtual machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor and a memory;
   wherein the at least one processor is configured to:
   receive a first set of metric data of a virtual machine, the first set of metric data comprising CPU usage, disk I/O usage, and network usage of the virtual machine at equally-spaced time points over a first time period;
   train a plurality of time series forecasting models on the first set of metric data for the first time period;
   predict a future time when the virtual machine will be idle based on the trained plurality of time series forecasting models;
   select one of the trained plurality of time series forecasting models having a highest prediction accuracy;
   monitor the virtual machine during a second time period;
   collect a second set of the metric data over equally-spaced time points during the second time period, the first time period differs from the second time period;
   apply the selected trained time series forecasting model to the collected second set of metric data;
   forecast a time when the CPU usage of the virtual machine during a next time interval immediately following the second time period is below a threshold; and
   when the forecasted time that the CPU usage of the virtual machine is below a threshold in the next time interval, initiate actions to reduce resource consumption of the virtual machine.

2. The system of claim 1, wherein the first set of metric data further includes usage data, the usage data including type of operating system, size of virtual machine, type of virtual machine, type of cloud service, and/or location of data center of the virtual machine.

3. The system of claim 1, wherein the plurality of time series forecasting models includes at least three of autoregressive integrated moving average (ARIMA), error, trend, seasonality (ETS), trigonometric box-cox transformation (TBATS), or a decomposable time series forecasting model.

4. The system of claim 1, wherein the plurality of time series forecasting models includes at least one of ARIMA, ETS, TBATS, or a decomposable time series forecasting model.

5. The system of claim 1, wherein the plurality of time series forecasting models includes two or more of ARIMA, ETS, TBATS, or a decomposable time series forecasting model.

6. The system of claim 1, wherein the initiation of actions to reduce resource consumption of the virtual machine comprises shutting down the virtual machine.

7. The system of claim 1, wherein the at least one processor is further configured to:
   generate a cost savings estimate for the reduction of the resource consumption.

8. A method, comprising:
   obtaining a plurality of time series forecasting models trained to predict a future idle time of a virtual machine, wherein each of the time series forecasting models is trained on first metric data of the virtual machine over a training period, the first metric data comprising CPU usage, network I/O usage, and disk I/O usage obtained at equally-spaced time intervals;
   selecting one of the trained plurality of time series forecasting models based on accuracy of the predicted future idle time;
   receiving second metric data during a production run of the virtual machine during a second time period, the second metric data comprising CPU usage, network I/O usage and disk I/O usage;
   applying the selected time series forecasting model to the received second metric data during the production run to forecast a next idle time of the virtual machine within a time period immediately following the first time period that is below a threshold; and
   initiating measures to shut down the virtual machine during the forecasted next idle time.

9. The method of claim 8, wherein the plurality of time series forecasting model includes at least two of autoregressive integrated moving average (ARIMA), error, trend, seasonality (ETS), trigonometric box-cox transformation (TBATS), or a decomposable time series forecasting model.

10. The method of claim 8, wherein the first metric data includes usage data, the usage data including a type of operating system, size of virtual machine, type of virtual machine, type of cloud service, and/or location of data center of the virtual machine.

11. The method of claim 8, wherein initiating measures to shut down the virtual machine include requesting permission from a user of the virtual machine to shutdown the virtual machine.

12. The method of claim 10, wherein the future idle time is based on CPU usage forecasted to be below an idle threshold for the virtual machine, wherein the idle threshold is based on historical metric data and the usage data of the virtual machine.

13. The method of claim 8, further comprising:
restarting the virtual machine after the next idle time.

14. The method of claim 8, wherein prior to initiating measures to shut down the virtual machine during the next idle time, informing a user of the virtual machine of the forecasted next idle time.

15. A device, comprising:
at least one processor and a memory;
wherein the memory includes instructions that when executed on the at least one processor performs actions that:
trains a plurality of time series forecasting models on a first set of metric data from a virtual machine to predict a future idle time of the virtual machine, the first set of metric data including a time series of equally-spaced data points comprising CPU usage, network usage, and disk I/O usage of the virtual machine during a training period;
selects one of the trained plurality of time series forecasting models having a highest prediction accuracy; and
during a production run of the virtual machine:
collects a second set of metric data during a second time period, wherein the second set of metric data comprises CPU usage, network usage, and disk I/O usage;
forecasts a second idle time of the virtual machine that is below a threshold using the select one of the plurality of time series forecasting models during a second time period, the second time period immediately following the first time period; and
automatically shuts down the virtual machine at the second idle time within the second time period.

16. The device of claim 15, wherein the memory includes further instructions that when executed on the at least one processor performs additional actions that:
restarts the virtual machine after the second idle time.

17. The device of claim 15, wherein the plurality of time series forecasting models includes two or more of a decomposable time series model, autoregressive integrated moving average (ARIMA), error, trend, seasonality (ETS), or trigonometric box-cox transformation (TBATS).

18. The device of claim 15, wherein the first set of metric data includes usage data, the usage data including a type of operating system, size of virtual machine, type of virtual machine, type of cloud service, and/or location of data center of the virtual machine.

19. The device of claim 15, wherein automatically shutting down the virtual machine is performed upon concurrence of a user of the virtual machine.

* * * * *